United States Patent

[11] 3,618,009

| [72] | Inventor | Joseph K. Lee<br>10616 Bramblebush, Whittier, Calif. 90601 |
|---|---|---|
| [21] | Appl. No. | 875,450 |
| [22] | Filed | Nov. 10, 1969 |
| [45] | Patented | Nov. 2, 1971<br>Continuation-in-part of application Ser. No. 711,269, Mar. 7, 1968, now Patent No. 3,541,505. |

[54] AUTOMOBILE SWITCH CONTROL AND ALARM SYSTEM
12 Claims, 3 Drawing Figs.
[52] U.S. Cl. .................................................. 340/64, 200/45, 180/114
[51] Int. Cl. .................................................. B60r 25/00
[50] Field of Search .......................................... 340/63, 64; 200/42, 43, 44, 45, 61–66; 180/114

[56] References Cited
UNITED STATES PATENTS
2,295,178  9/1942  Kolias.......................... 340/64

*Primary Examiner*—Alvin H. Waring
*Attorney*—Christie, Parker & Hale

ABSTRACT: An automobile antitheft system has an override mechanism for the ignition lock normally to prevent insertion of the ignition key into the lock. A number of pushbuttons located on the instrument panel are labeled to identify a secret code, and the pushbuttons are electrically coupled to the override mechanism to disable the mechanism when the proper code is selected. The pushbuttons are also electrically coupled to an alarm so that selecting an improper code activates the alarm.

PATENTED NOV 2 1971　　　　3,618,009

INVENTOR.
JOSEPH K. LEE

BY
Christie, Parker & Hale
ATTORNEYS

AUTOMOBILE SWITCH CONTROL AND ALARM SYSTEM

CROSS REFERENCE TO RELATED APPLICATION

This application is a continuation-in-part of my copending application Ser. No. 711,269, filed Mar. 7, 1968, now U.S. Pat. No. 3,541,505.

BACKGROUND OF THE INVENTION

1. Field of the Invention

This invention relates to automobile antitheft systems, and more particularly, to a system which includes an override mechanism responsive to selection of a secret code for controlling operation of an automobile ignition lock. The system is further adapted to activate a warning device in the event an improper code is selected.

2. Description of the Prior Art

A variety of automobile antitheft systems have been developed in recent years. A substantial number of these systems include some type of warning device such as an alarm, a buzzer, or a panel light activated when the driver leaves his key in the ignition lock. Antitheft systems of this type are satisfactory in preventing a substantial number of automobile thefts, but they are generally not capable of preventing thefts when an unauthorized person has possession of the automobile owner's ignition key. Therefore, it is desirable to provide an automobile antitheft system which not only alerts the driver to remove his key from the ignition lock, but which also prevents an unauthorized person from starting an automobile even when he has the proper ignition key in his possession.

SUMMARY OF THE INVENTION

This invention provides an automobile antitheft system which includes an override mechanism for normally preventing insertion of an ignition key into the key barrel of an automobile ignition lock. The system further includes apparatus responsive to selection of a secret code known to the owner of the automobile for disabling the override mechanism to permit the key to be inserted into the ignition lock. Thus, an unauthorized person not informed of the proper code cannot start the automobile even though he has the ignition key in his possession. The system can also be adapted to include an alarm activated in the event an unauthorized person uses an improper code combination to disable the override mechanism.

Briefly, this invention contemplates a key-operated automobile ignition lock with locking means movable between a normally locked position preventing passage of the ignition key into the key barrel of the lock and an unlocked position permitting passage of the key into the barrel. A plurality of selectively operable sensing means preferably in the form of pushbuttons mounted on the automobile instrument panel define both properly selected sensing means preferably identified by a predetermined code and improperly selected sensing means. An electrical lock control circuit connected to the locking means is operable in response to actuation of the sensing means bearing the predetermined code to move the locking means from its normally locked position to its unlocked position to thereby allow insertion of the key into the key barrel. The electrical lock control circuit is inoperable when the improperly selected sensing means are actuated, thereby maintaining the locking element in its locked position preventing insertion of the ignition key into the key barrel.

Preferably, the locking means includes a movable locking element movable between the normally locked position in the key barrel and the unlocked position permitting passage of the key into the barrel. In the preferred form of the invention the locking means further includes movable retaining means arranged to cooperate with the locking element to maintain the locking element in its locked position. Preferably, the retaining means comprises a solenoid having a reciprocable plunger normally disposed to prevent movement of the locking element from its locked position. The solenoid is connected to the electrical lock control circuit so that actuation of the sensing means bearing the predetermined code moves the plunger to a disabled position permitting movement of the locking element to its unlocked position.

Preferably, the invention further includes an alarm and an electrical alarm control circuit connected to the alarm operable to activate the alarm in response to actuation of the improperly selected sensing means. An electrical intercoupling circuit connected to the electrical alarm control means is operable in response to actuation of the properly selected sensing means for activating the alarm in the event the properly selected sensing means are not selected in a predetermined sequence. When the proper code combination is selected and the key is inserted into the ignition lock, an electrical circuit preferably disables the alarm to prevent it from being activated so long as the key remains in the lock. An electrical reset circuit is preferably provided for returning both the retaining means to its normal position and the locking element to its locked position when the key is removed from the key barrel.

BRIEF DESCRIPTION OF THE DRAWINGS

These and other aspects of the invention will be more fully understood from the following description and the accompanying drawings, in which.

DETAILED DESCRIPTION OF THE PREFERRED EMBODIMENT

Figure 1:
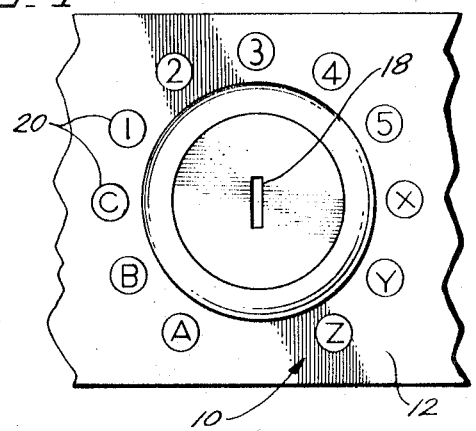
FIG. 1 shows a series of alphanumeric pushbuttons in combination with a conventional key-operated automobile ignition lock.

Referring to the drawings, a conventional automobile ignition lock 10 mounted on an instrument panel or dashboard 12 of an automobile (not shown) is adapted to open and close an ignition switch 14 in response to rotation of an ignition key 16 which fits into a key slot 18 in ignition lock 10. Sensing means including a series of alphabetically or numerically labeled pushbuttons 20 are circumferentially disposed about the outer perimeter of ignition lock 10. Preferably, each pushbutton is identified by a respective number 1 through 5 or a respective letter A, B, C, X, Y, or Z. These numbers and letters can be combined in any suitable combination to provide a secret code known to the owner of the automobile. In accordance with this invention, the automobile ignition system is adapted in a manner hereinafter described to require that knowledge of the code be indicated by punching the appropriate pushbuttons before ignition lock 10 will accept ignition key 16. Although it is preferred to mount pushbuttons 20 in close proximity to ignition lock 10 as shown in FIG. 1, pushbuttons or other equivalent means for sensing knowledge of the secret code can be disposed in any suitable arrangement and located at any desirable place within the automobile without departing from the scope of this invention. Further, although the combination of independent and distinct alphabetical and numerical symbols shown in FIG. 1 is preferred, any desired combination of symbols can be used.

Figure 2:
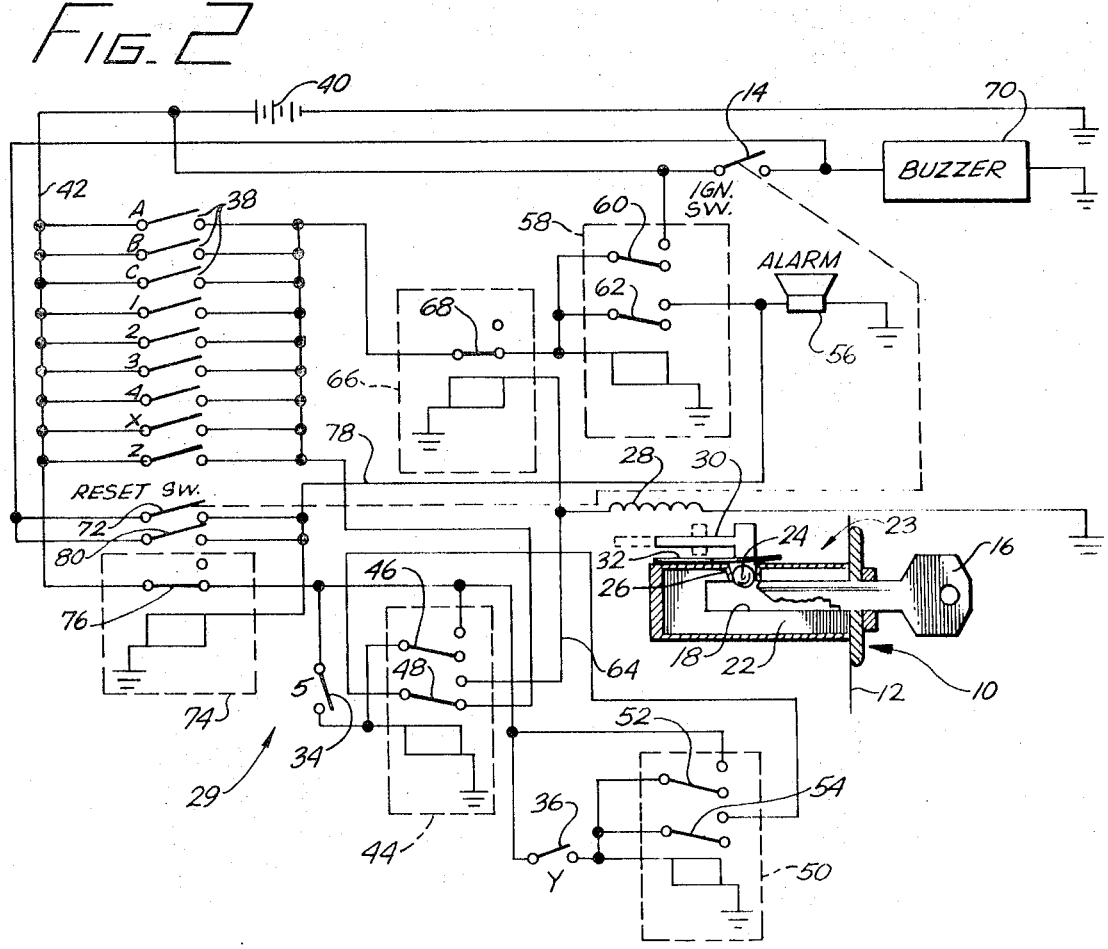
FIG. 2 is a schematic circuit diagram showing the automobile ignition switch control and alarm system of this invention in its normally deactivated condition preventing insertion of a key into an automobile ignition lock.
Figure 3:
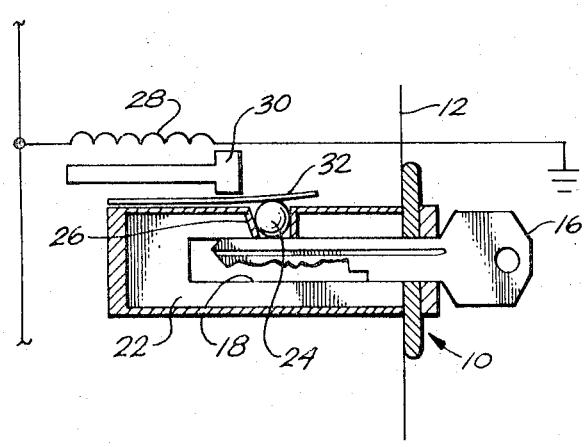
FIG. 3 is a schematic view showing the ignition lock of FIG. 2 in its activated condition permitting passage of the key into the ignition lock.

The operation of the ignition switch control and alarm system of this invention may be understood by referring to FIG. 2. Key slot 18 extends longitudinally into an elongated transversely circular rotatable key barrel 22. When ignition key 16 is inserted into key slot 18 and key barrel 22 is rotated to the ignition ON position, ignition switch 14 closes. An ignition lock override mechanism 23 includes a locking element preferably in the form of a small metal ball 24 is adapted to move in a groove or channel 26 extending radially upwardly from key slot 18 to the exterior of key barrel 22. Retaining means in the form of a solenoid 28 disposed longitudinally adjacent to the exterior of key barrel 22 is connected to an electrical ignition switch control circuit 29 hereinafter described in detail. The solenoid includes an elongated reciprocable plunger 30 normally extending outwardly from the solenoid when the solenoid is not energized by ignition switch control circuit 29. An elongated keeper lever 32 constructed from a flat strip of resilient material is disposed between plunger 30 and the exterior of key barrel 22 so that it covers the exterior opening of radial channel 26. The bottom exterior surface of plunger 30 abuts against the upper surface of keeper lever 32, and when the plunger is in its extended position as shown in FIG. 2, the plunger forces keeper lever 32 down over the outer opening of radial channel 26 to keep metal ball 24 in a locked position locked against movement relative to the channel. In its locked position, metal ball 24 prevents ignition key 16 from being inserted into key slot 18. When solenoid 28 is energized by ignition switch control circuit 29, plunger 30 retracts into the solenoid as shown in FIG. 3 to disable override mechanism 23 by allowing keeper lever 32 to move relative to the outer opening of radial channel 26. In use when plunger 30 is in its retracted position, insertion of ignition key 16 into key slot 18 is permitted because pushing of the key into the slot forces movable metal ball 24 upwardly in radial channel 26 away from its locked position.

Further structural details of ignition lock override mechanism 23 are not emphasized herein because of the similarity to my automobile alarm system described in my copending patent application Serial No. 711,269, filed March 7, 1968. 1968. In that alarm system a radially movable mechanical element similar to metal ball 24 is disposed in the key barrel of an automobile ignition lock and is responsive to the presence of a key in the lock for activating a solenoid which controls an automobile door lock mechanism.

In the following description of electrical control circuit 29 it is assumed for the purposes of explanation that the proper code combination selected from pushbuttons 20 for use in disabling override mechanism 23 is 5-Y; that is, the pushbuttons labeled 5 and Y must be punched in sequence to retract plunger 30 of the override mechanism. The means for sensing selection of the proper code combination include a first lock control switch 34 and a second lock control switch 36 respectively closed when the pushbuttons labeled 5 and Y are punched. Each of the remaining pushbuttons, those labeled A, B, C, 1 through 4, X, and Z, are adapted to close a respective switch 38 when actuated. These pushbuttons provide means for sensing an improper selection of the secret code combination and are not adapted to disable override mechanism 23.

Electrical ignition switch control circuit 29 includes a power source, preferably a conventional automobile storage battery 40 having one terminal grounded and the other terminal connected to a lead line 42. First lock control switch 34 is connected directly to lead line 42 so that in use first lock control relay 44 is energized as the switch 34 is closed by the actuation of pushbutton 5. First relay 44 includes a first armature 46 movable from an initially open position to a closed position when the relay 44 is energized. In its closed position first armature 46 connects first relay 44 directly to storage battery 40 so that relay 44 is locked in an energized condition even though first lock control switch 34 returns to its open position after pushbutton 5 is activated. First lock control relay 44 further includes a second armature 48 movable from an initially closed position to a second closed position for a purpose hereinafter described. Second lock control switch 36 is connected directly to lead line 42 so that in use a second lock control relay 50 is energized as the switch 36 is closed by the actuation of pushbutton Y. Second relay 50 includes a first armature 52 movable from an initially open position to a closed position when the relay 50 is energized. In its closed position armature 52 locks relay 50 in an energized condition even though second lock control switch 36 returns to its open position after pushbutton Y is activated. Second lock control relay 50 further includes a second armature 54 movable from an initially open position to a closed position when the relay 50 is energized. Lock control switches 34 and 36 are connected in series with power supply 40 and with solenoid 28 so that in use when both switches are actuated, their respective second armatures 48 and 54 move to their closed positions to supply power to solenoid 28. This causes plunger 30 to retract to thereby disable ignition lock override mechanism 23 to permit insertion of ignition key 16 into key slot 18 of key barrel 22.

Switches 38 are connected in parallel with one another and with second lock control switch 36. The parallel arrangement of switches 38 and switch 36 is further connected in series with power supply 40 and with an alarm 56. In use, when any one of switches 38 is actuated, thereby indicating that the proper code combination has not been selected, an alarm control relay 58 is energized, causing a first alarm relay armature 60 to move from an open position to a closed position thereby locking the alarm relay 58 in an energized condition even though the particular switch 38 has returned to its open position after being activated by its respective pushbutton. Alarm control relay 58 further includes a second alarm relay armature movable from an initially open position to a closed position when the alarm relay 58 is energized to activate alarm 56. Preferably, alarm 56 is a conventional automobile horn, although the alarm can be any other type of warning device capable of producing a relatively loud audible signal to indicate that an unauthorized person has selected an improper pushbutton instead of the proper code combination.

The electrical ignition switch control circuit 29 is preferably adapted so that pushbuttons 5 and Y must be punched in sequence to disable override mechanism 23. In use, in the event pushbutton Y is punched without having first punched pushbutton 5, second lock control switch 36 closes to energize lock control relay 50 thereby moving armatures 52 and 54 to their closed positions while armature 46 of first lock control relay 44 remains in its initially closed position so that power is supplied to alarm control relay 58 to energize the relay and sound alarm 56.

The means provided by this invention for sounding alarm 56 in the event an improper code combination is selected can be further adapted to activate antitheft devices such as a hood lock mechanism or a steering wheel lock.

Assuming that the proper code has been selected to disable override mechanism 23 it becomes desirable to thereafter prevent alarm 56 from being activated so long as ignition key 16 remains in the ignition lock. Thus, a lead line 64 extending away from solenoid 28 is connected to a first interrupting relay 66 having a normally closed relay armature 68 connected in series between the parallel arrangement of switches 38 and alarm control relay 58. When power is supplied to solenoid 28 to disable override mechanism 23, power is also supplied by lead line 64 to energize interrupting relay 66 so that its armature 68 moves to an open position to prevent alarm 56 from being activated so long as plunger 30 remains in its retracted position.

Once the proper code combination has been selected and ignition key 16 is in the ignition lock 10, it may be further desirable to provide a conventional warning device such as a buzzer 70 or a panel light (not shown) to notify the operator of the automobile whenever ignition key 16 remains in the ignition lock after the lock is turned to its OFF position. A warning device of this type is shown schematically in FIG. 2 wherein a part of ignition switch 14 is adapted to close when key barrel 22 is rotated to its OFF position. The closing of switch 14 activates buzzer 70 to notify the driver that the key should be removed from the ignition lock. Ignition switch 14 can be further adapted by conventional means to return to its open position to thereby deactivate buzzer 70 when key 16 is removed from the ignition lock. Buzzer 70 can be a separate device as shown in FIG. 2, or it can be combined with a solenoid and plunger into a single unit such as those used in the conventional automobile warning mechanisms which sound when the ignition key is in the OFF or LOCK position.

When key 16 is removed from ignition lock 10, it is further desirable to provide means for returning override mechanism 23 to its initial position shown in FIG. 2. Thus, a normally open reset switch 72, adapted by conventional means to move a closed position when ignition switch 14 returns to its open position, energizes a second interrupting relay 74 when closed. A normally closed armature 76 of interrupting relay 74 moves to an open position when the relay 74 is energized so that power supplied to first lock control relay 44 and second lock control relay 50 is momentarily interrupted, thereby permitting both armatures of each relay to return to their original positions shown in FIG. 2. Since power is supplied to solenoid 28 through armature 46 and 52 or lock control relays 44 and 50, respectively, the closing of reset switch 72 also cuts off the power to solenoid 28, so that plunger 30 moves from its retracted position to its normal extended position cooperating with metal ball 24 to prevent insertion of key 16 into key barrel 22 of ignition lock 10.

It has been seen that code combination 5-Y must be punched in sequence to disable override mechanism 23. Since lock control switches 34 and 36 are connected in a series with power source 40 and solenoid 28, it is necessary to provide means for preventing solenoid 28 from being energized in the event the improper combination Y-C is selected. It is further necessary to prevent the solenoid from being energized in the event pushbuttons 5 and Y are selected in the proper sequence but with one or more intervening incorrect pushbuttons, such as the combination 5-A-Y. In both of these example situations, selection of the improper pushbuttons Y and A, respectively, activates alarm 56 in the manner previously described. A lead line 78 leading from the alarm supplies power to second interrupting relay 74 to maintain the relay in its energized condition so long as alarm 56 remains activated. Thus, armature 76 of relay 74 remains in its open position to cut off the supply of power to lock control relays 44 and 50. This prevents power from being supplied to solenoid 28 and therefore maintains the solenoid in its normally extended position to prevent override mechanism 23 from being disabled so long as alarm 56 remains activated. A normally open switch 80 is provided in parallel with reset switch 72 so that an authorized person, i.e., one who has key 16 and knows the code for circuit 29, may disable alarm 56 in the event he inadvertently selects the wrong ones of sensing devices 20 in operating the system. Switch 80 is preferably located at some inconvenient location, such as in the automobile luggage compartment. The presence of switch 80 is of no aid to an unauthorized person who may possess key 16 but not know the code for circuit 29.

Override mechanism 23 of this invention provides means for substantially reducing the cost of manufacturing ignition lock mechanisms for automobiles. That is, the same key slot, suitably contoured, can be used for all automobile ignition locks. The contour of the key slot would not match the contour of the particular automobile door key, except that in use the door key would be capable of rotating the key barrel once the override mechanism is disabled by punching the proper code and the door key is inserted into the slot.

I claim:

1. Apparatus for controlling the insertion of a key into the key barrel of an automobile ignition lock, the apparatus comprising:
   a. a plurality of selectivity operable sensing means defining properly selected sensing means and improperly selected sensing means;
   b. locking means movable between a normally locked position preventing passage of the key into the key barrel and an unlocked position permitting passage of the key into the key barrel; and
   c. electrical lock control means operable in response to actuation of the properly selected sensing means to move the locking means from its normally locked position to its unlocked position to thereby allow insertion of the key into the key barrel.

2. Apparatus according to claim 1 wherein the locking means comprises a movable locking element movably disposed within the key barrel movable between a normally locked position preventing passage of the key into the key barrel and an unlocked position permitting passage of the key into the key barrel, and movable retaining means arranged to cooperate with the locking element to normally maintain the locking element in its locked position, the retaining means being movable to a disabled position permitting movement of the locking element; and wherein the electrical lock control means is operable to move the retaining means from its normal position to its disabled position.

3. Apparatus according to claim 2 including reset means for returning both the retaining means to its normal position and the locking element to its locked position when the key is removed from the key barrel.

4. Apparatus according to claim 1 including an alarm, and electrical alarm control means in circuit connection with the alarm operable in response to actuation of the improperly selected sensing means to activate the alarm.

5. Apparatus according to claim 2 wherein the key barrel defines a key slot, and a channel extending radially from the key slot, the locking member being movable within the channel into and out of engagement with the key slot; and wherein the retaining means comprises a solenoid having a reciprocable plunger arranged to normally engage the channel to prevent the locking member from moving out of engagement with the key slot.

6. Apparatus according to claim 1 wherein the selectively operable sensing means comprises a plurality of pushbuttons each of which possesses a respective code symbol to distinguish the properly selected sensing means from the improperly selected sensing means, and a switch associated with each pushbutton for closing the circuit connection between the locking means and the electrical lock control means when only the properly selected sensing means are activated in a predetermined sequence.

7. Apparatus according to claim 1 wherein the electrical lock control means comprises an electrical circuit including in series a power source, at least two properly selected sensing means, and the locking means disposed in its normally locked position, whereby actuating the properly selected sensing means supplies power to the locking means to move it to its unlocked position.

8. Apparatus according to claim 4 wherein the electrical alarm control means comprises an electrical circuit including in series a power source, an electrical circuit including in parallel one or more improperly selected sensing means, and the alarm, whereby actuating any one of the improperly selected sensing means supplies power to the alarm.

9. Apparatus according to claim 4 including electrical intercoupling means in circuit connection with the electrical alarm control means operable in response to actuation of the properly selected sensing means for actuating the electrical alarm control means in the event the properly selected sensing means are not actuated in a predetermined sequence.

10. Apparatus according to claim 9 including electrical means in circuit connection with the electrical alarm control means operable in response to actuation of the electrical lock control means for disabling the alarm in the event the properly selected sensing means are actuated in the predetermined sequence.

11. Apparatus according to claim 3 wherein the reset means includes electrical means in circuit connection with the electrical lock control means for interrupting the circuit connection between the electrical lock control means and the retaining means.

12. Apparatus according to claim 4 including electrical means in circuit connection with the electrical lock control means operable in response to actuation of the electrical alarm control means for disabling the electrical lock control means in the event the alarm is activated.

* * * * *